Feb. 25, 1964 S. S. CORSO 3,122,244
BATTERY REMOVER AND REPLACER APPARATUS
Filed May 24, 1962 3 Sheets-Sheet 2
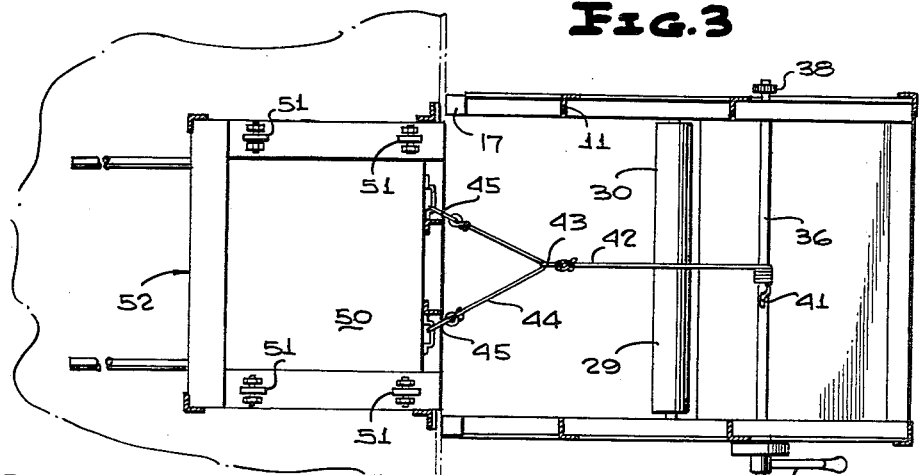
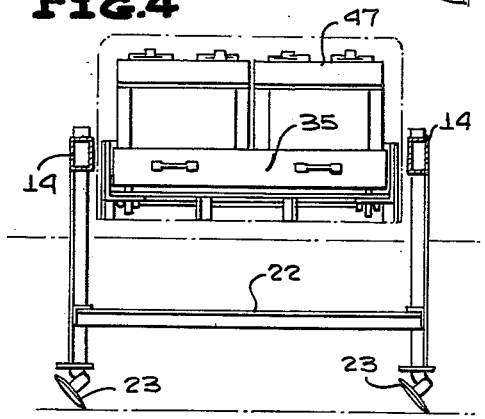
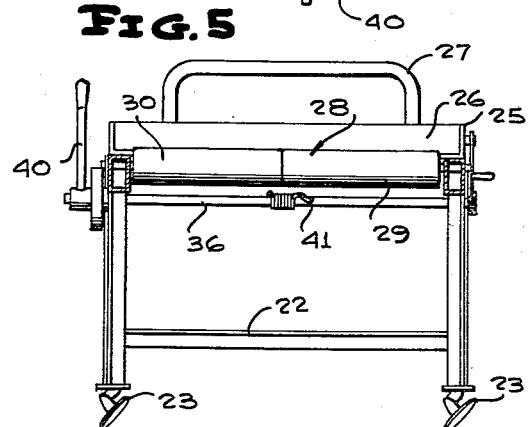
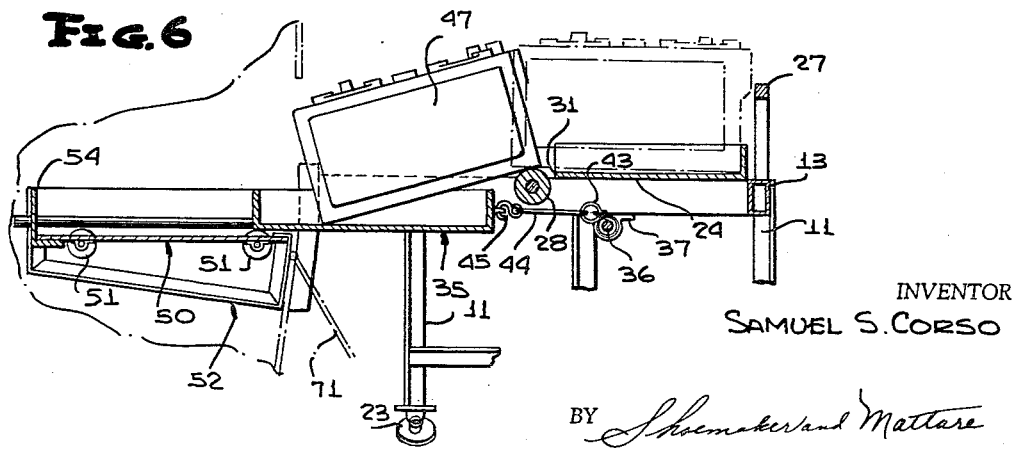
INVENTOR
SAMUEL S. CORSO
BY Shoemaker and Mattare
ATTORNEYS Feb. 25, 1964  S. S. CORSO  3,122,244
BATTERY REMOVER AND REPLACER APPARATUS
Filed May 24, 1962  3 Sheets-Sheet 3
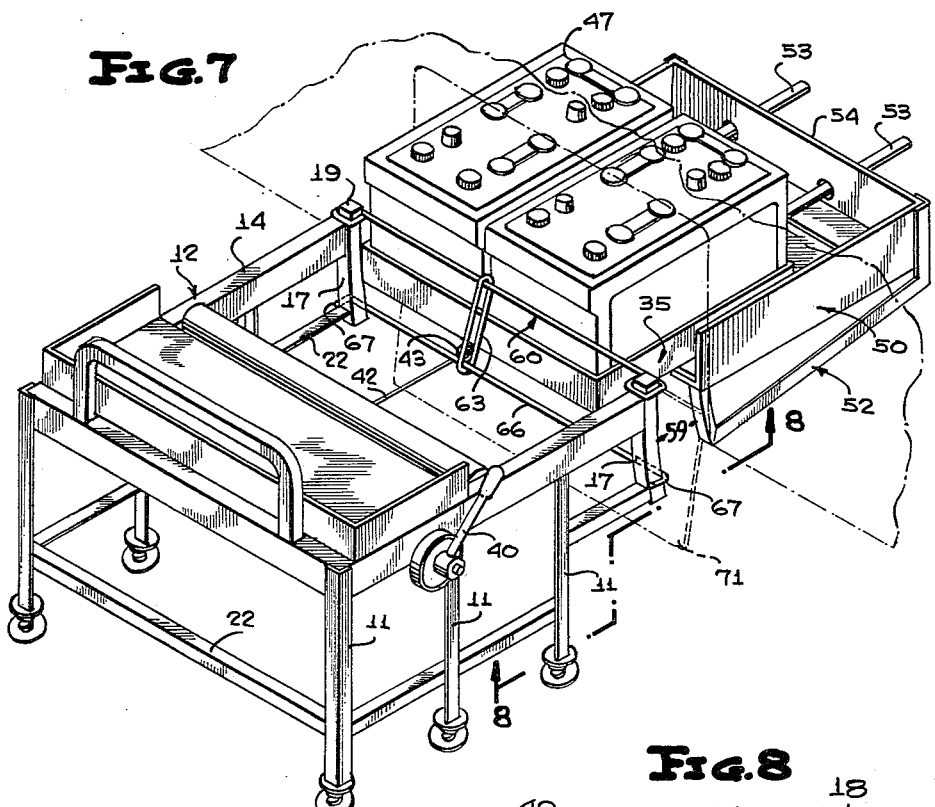
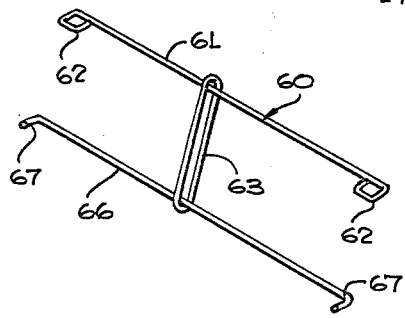
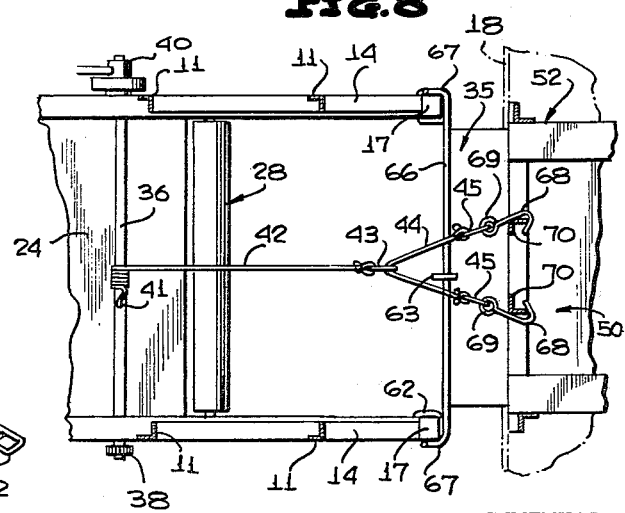
INVENTOR
SAMUEL S. CORSO
BY *Shoemaker and Mattare*
ATTORNEYS

United States Patent Office 3,122,244
Patented Feb. 25, 1964

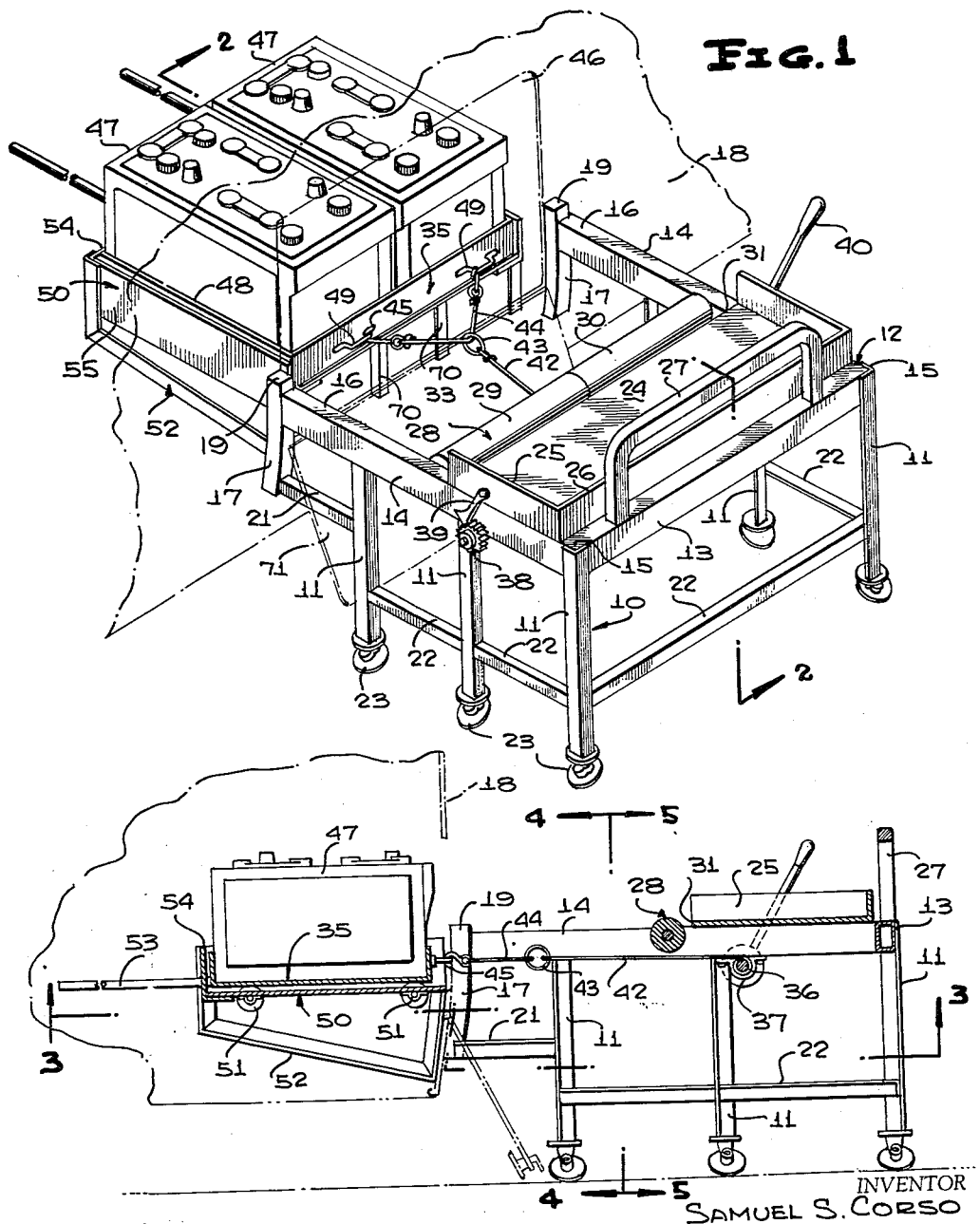

3,122,244
BATTERY REMOVER AND REPLACER
APPARATUS
Samuel S. Corso, 77—22 14th Ave., Brooklyn, N.Y.
Filed May 24, 1962, Ser. No. 197,323
14 Claims. (Cl. 214—38)

The present invention relates to an apparatus for removing batteries and replacing them in a vehicle and the like and more particularly to such an apparatus where the battery is removed from its normal space in a vehicle and moved to another location for service thereof.

It is an object of the present invention to provide a novel battery remover apparatus to eliminate the need for a person to lift a heavy battery from the compartment in a vehicle in order to service it.

It is another object of the present invention to provide a battery remover apparatus that is of a compact nature and is inexpensive to manufacture for use in removing batteries from vehicles where a large number of heavy batteries must be removed from a consequential number of vehicles. For example, it is a common practice in fleet operations of vehicles such as buses, trucks, taxicabs and the like to periodically inspect the batteries of the commercial vehicle before the battery requires servicing or recharging or replacement. In such cases, it is obvious that the breakdown or inoperation of the vehicle due to a defective battery is inexcusable because by this time the damage has been done and will cause great inconvenience to passengers carried by the vehicle or goods transported therein which must reach their destination by a certain time interval. Accordingly, in such fleet operations of commercial vehicles, the batteries are serviced or checked upon return to the garage at night or at the duration of their regularly scheduled runs. For example, in the fleet operations of transit buses, when the vehicles are returned to the garage, it is a common practice to immediately check the battery and other necessary parts to prevent breakdown of the vehicle in operation.

It is another object of the present invention to provide a battery remover apparatus which can be moved adjacent the compartment of the vehicle in which the battery is housed so that the tray in which the battery is disposed may be easily slid out of the vehicle compartment so that the batteries can be easily lifted onto a supporting tray means and thereafter removed to a point for servicing them.

It is another object of the present invention to provide a battery remover apparatus provided with tensioning means for connecting to the support tray in which the batteries are disposed in a compartment of a vehicle so that the tray and the batteries may be moved laterally out of the compartment by merely actuating the rotatable drive means for the tensioning means.

It is another object of the present invention to provide a battery remover apparatus in which the apparatus comprises support means and a table means to carry the tensioning means for sliding a tray carrying the batteries between the support means and adjacent the table means so that the ends of the batteries may be readily guided and lifted onto the table means.

It is another object of the present invention to provide a battery remover apparatus which is disposed alongside the compartment in which the batteries of the vehicle are contained and in which flexible cable means are provided for connecting it to the sliding tray of the battery support so that the battery support can be guided laterally outwardly from the interior of the compartment until the batteries are disposed adjacent a support table and thereafter can be lifted easily thereon over roller means.

It is another object of the present invention to provide a battery remover apparatus having reset means detachably connected thereto so that after the battery has been removed by the apparatus from the compartment of a vehicle and serviced, the reset means may be attached to the apparatus and the heavy batteries and the slidable tray normally disposed within the battery compartment of a vehicle may thereafter be pushed back into the battery compartment by the apparatus.

It is still another object of the present invention to provide a battery remover and reset apparatus in which certain portions of the apparatus may be selectively operated to remove the battery from the interior compartment of a vehicle at one time, and in which the reset means may be selectively operated to reset the battery back into the compartment of a vehicle after it has been serviced.

Various other objects and advantages of the present invention will be readily apparent from the following detailed description when considered in connection with the accompanying drawings forming a part thereof and in which:

FIG. 1 is a perspective view of the battery remover apparatus of the present invention attached to the slidable tray in which the battery is carried within a vehicle for sliding the batteries and tray from the vehicle.

FIG. 2 is a sectional view taken along lines 2—2 of FIG. 1.

FIG. 3 is a bottom plan view of the battery remover apparatus of the present invention shown with the tensioning means embodied therein connected to the battery tray for removal of the battery from the compartment of the vehicle.

FIG. 4 is a section taken along lines 4—4 of FIG. 2 in a direction looking into the battery compartment of a vehicle.

FIG. 5 is a section taken along lines 5—5 of FIG. 2 of the battery remover apparatus looking in a direction away from the battery compartment of a vehicle.

FIG. 6 is a side elevational view similar to FIG. 2, but showing the battery tray in a position adjacent the battery support table of the apparatus and with the leading edge of the battery being pulled onto the battery table of the apparatus.

FIG. 7 is a perspective view of the battery remover apparatus of the present invention with the reset means attached thereto and the battery and its carrying tray being pushed back into the compartment of the vehicle.

FIG. 8 is a fragmentary bottom plan view taken along lines 8—8 of FIG. 7, and

FIG. 9 is a detail drawing of the reset means attached to the battery apparatus.

Referring to the drawings, the reference numeral 10 generally designates the battery remover apparatus which has six vertical legs 11 made of angle iron secured at their upper end to a horizontal frame 12 by welding or the like. The frame 12 has a horizontal or a transverse member 13 and two longitudinal members 14 so as to form a U-shaped frame, all of which parts may be made of angle iron. The vertical legs 11 are secured to the frame 12 adjacent the rear corners 15 thereof and the other legs 11 are disposed in spaced relationship along both sides of the longitudinal members 14 as clearly shown in the drawings, and so that a substantial portion 16 of the longitudinal members 14 extend forwardly of and beyond the forwardly disposed legs 11 in order to receive the battery tray therebetween as hereinafter described.

The front edge of each portion 16 is provided with an arcuate vertical member 17 secured thereto so as to conform to the complementary side of a vehicle 18 alongside of which the battery remover apparatus is positioned for removing the battery therefrom. The upper end 19 of the members 17 project above 16 to receive the reset means hereinafter described. The members 17 extend a substantial distance below 16 and have a horizontal brace 21 secured thereto and to the front legs 11. Lower brace members or struts 22 are disposed between the legs 11 to make the apparatus more rigid, while the lower ends of the legs are provided with dolly casters 23 or if desired they may be provided with rollers for readily moving the apparatus around on a hard surface.

A rectangular support tray or support table 24 is secured to the frame 12 between the rear legs 11 and the middle legs 11. The tray 24 is provided with vertical side walls 25 and a back or rear wall 26 and supports the batteries thereon when they are removed from the vehicle 18. An upstanding U-shaped handle 27 is secured to the frame 12 adjacent to the rear legs 11 for pulling or pushing the apparatus from one location to another. A split roller member 28 having two sections 29 and 30 is disposed between the members 14 adjacent the leading edge 31 of the tray 24 so that the batteries can be individually rolled or pulled up onto the tray 24 or table after the battery carrying tray has been pulled out of the battery compartment of the vehicle. The roller 28 is disposed about mid-way of the length of the members 14 so that a space 33 is provided between the forward ends of the members 14 to receive the slidable battery tray 35 therein.

A rotatable axle or rod 36, see FIGS. 2 and 3, extends between the members 14 adjacent the rear side of the middle legs 11 and is journalled as indicated at 37 in support members secured to the underside of the horizontal members 14. A ratchet wheel 38 is fixed to the axle 36 and a pawl member 39 secured to the sides 25 of the table 24 meshes with the ratchet wheel. The ratchet wheel 38 is on the left side of the apparatus when looking toward the vehicle 18 as best shown in FIG. 1. The opposite end of the axle 36 is provided with a handle member 40 thereon for rotating the axle 36 to which it is fixed, and the ratchet 38. A flexible cable 42 has one end 41 fastened to the mid-portion of the rotatable rod 36. The free end of the cable is fastened to a ring 43 through which is threaded a relatively short cable 44 having hooks 45 fastened to the end thereof. The handle 40 may be rotated so as to wind up the cable 42 about the bar 36 as best seen in FIG. 3. The pawl 39 may be disengaged from the ratchet wheel 38 as desired, so that the bar 36 may be rotated in either direction.

The vehicle 18 is provided with a battery compartment generally designated 46 therein, in which the batteries 47 are disposed.

The batteries 47 are positioned within the slidable battery tray 35 which is generally rectangular in shape and is provided with small upstanding or vertical walls 48 therearound including a front wall, a rear wall and oppositely disposed side walls. Two spaced pull handles 49 are provided on the front wall of the tray 35. The tray itself is supported on a platform 50 that is fixed or stationarily disposed within the interior of the vehicle 18. The platform 50 is provided with two spaced transversely extending roller members 51 therein so that the tray 35 may be slid into and out of the vehicle 18 in an easy manner such as the opening and closing of a drawer in a desk or the like. The reference numeral 52 generally designates the frame portion positioned interiorly of the battery compartment that supports the platform 50, the frame 52, of course, being stationary and fixed to the vehicle. The rear wall of the tray 35 has two spaced horizontal rods or bars 53 secured thereto and extending through openings in the rear wall 54 of the platform 50 which acts as guide members for the tray 35 as it is pulled out of the vehicle and slid back therein. The platform 50 is also provided with vertical side walls 55 but has no front wall opposite the rear wall 54 since it is through this side of the platform that the tray 35 is moved when the battery is removed from the vehicle and when it is being reset therein.

In operation when it is desired to remove the batteries from the compartment 46 of a vehicle such as a bus or the like, in order to deposit them on table 24 of the apparatus so that they can be taken to another location and there serviced, it is only necessary for the apparatus 10 to be drawn alongside of the vehicle 18 after a cover member, shown, is removed from the vehicle 18 or opened downwardly or upwardly as the case may be. Thereafter the apparatus is positioned alongside the vehicles so that the members 17 are disposed adjacent each side of the battery compartment opening. The cable is then unwound from the bar 36 until it is long enough so that the hooks 45 may be fastened to the handles 49 of the battery tray 35 within the vehicle 18. Thereafter the handle 40 is rotated to tension the cable 42 and the cable 44 and wind the cable 42 around the bar 36 until it is tensioned. The winding or rotating of the handle 40 is thereafter continued until the battery tray 35 is moved to the right, as shown in FIG. 6, until its leading edge or its front wall is within two inches or so of the roller member 28. The slidable battery tray 35 is easily slid out of the battery compartment due to the fact that it rests on the rollers 51 disposed in the platform 50. When the tray 35 is in a position shown in FIG. 6, it is only necessary for a person to grasp the front edge or leading edge of the battery or a handle positioned thereon, if desired, and lift it onto the roller 28. Thereafter the battery is pulled toward the right or away from the tray 35 until it assumes the position shown in dotted lines in FIG. 6, at which time it is disposed on and supported by the battery table 24.

The provision of the split roller 28 permits one battery at a time to be removed from the tray 35 and pulled onto the table 24, since only one battery will rest on a section 29 or 30 of the roller and hence the removal of the other battery after the first battery has been disposed on the table 24 will not in any way interfere with its removal.

When both of the batteries have been removed from the tray 35 they may then be easily moved by pulling the apparatus 10 by the handle 27 to another location where they may be serviced. It will be noted that the diameter of the roller 28 and its position on the apparatus 10 is such that its upper end thereof is disposed slightly above the upper surface of tray 24 so that the battery will not bind on the surface of the table 24 as it is removed from the tray 35.

Referring to FIGS. 7, 8, and 9, the reset means generally designated 60 is shown by which the tray 35 and the heavy batteries disposed therein are reset or repositioned back into the vehicle compartment.

When it is desired to replace the batteries back into the tray 35 and push the tray 35 back into the vehicle, the apparatus 10 is again brought or returned from the place at which the batteries are serviced and placed alongside of the vehicle 18 as shown in FIG. 6. At this time the battery tray 35 is empty and is in a position shown in this figure, except that the cable 44 is not attached to the handles 49 on the tray 35. The end of the battery 47 adjacent the leading edge 31 is moved from the dotted line position shown in FIG. 6 and lifted over the roller 28 and dragged or rolled back into the extended tray 35 by hand. Thereafter the apparatus 10 is moved away from the vehicle so that the vertical members 17 are in spaced apart relationship with the vehicle to provide a space indicated as 59 therebetween. At this time the vertical members 17 are disposed adjacent the front wall of the tray 35, with the tray in the extended position shown in FIG. 7. The guide members 53 prevent the tray 35 and battery 47 from toppling over when the apparatus 10 is moved from the vehicle and the tray and batteries are to be pushed into the vehicle by the detachable reset means 60.

The reset attachment 60 comprises a horizontal rod or bar 61 having the opposite ends thereof looped as at 62, so as to form a rectangular shaped or square loop of sufficient diameter so that they can be positioned over the projections 19 on members 17. Another metal bar or rod 63 forming an elongated closed loop 64 is provided. The bar 63 has one end of the loop 65 closed over the bar 61 so that it is fixedly attached thereto although it can slide along the length of the member 61. The other end of the loop is enclosed around another metal bar or rod 66 having outwardly turned legs 67, which legs 67 extend in the same direction on one side of the bar 66 and are parallel to the other. The elongated loop is mounted on the bar 66 so that it too may be moved to the left or right or slid along the length of the member 66.

When it is desired to use the apparatus 10 to slide the tray 35 with the heavy batteries back into the compartment so as to completely enclose the batteries within the battery space. The bar 60 is positioned with the loops 62 mounted on projections 19. The loop 63 is positioned so that it extends diagonally downwardly and between the members 14 and with its lower bar 66 extending transversely of the members 14 and with the legs 67 gripping the outer portion of the forward vertical legs 17 of the apparatus 10. This position and fixment is clearly illustrated in FIGS. 7 and 8. Thereafter two identical hooks 68 having a ring 69 on one end thereof are hooked around the vertical struts 70 which are disposed on the front side of the battery fixed frame 52 which supports the platform 50 and the tray 35. The eyelets 69 of the hooks 68 have the hooks 45 of the cable member 44 threaded therethrough.

The cable 42 is then tensioned, as well as the cable 44 by actuating the handle 40 to rotate the cable 42 and wind it about the rotatable member 36.

When the cable is sufficiently tensioned it will cause the loop 63 to bear against the front wall of the tray 35 as thus shown in FIG. 7. Thereafter as the cable is continuously wound up upon the rod 36, the looped rod 63 will push against the front wall of the tray 35 and the frame 12 of the apparatus will move inwardly toward the side of the vehicle 18, since the camming action of the looped rod against the tray 35 cannot move the stationary frame 52 in the bus. The looped rod 63 will hence continuously push the tray 35 back into its drawer arrangement in the side of the vehicle. When it is completely enclosed within the compartment 46 it is merely necessary to untension or give the cable 42 slack so that the hooks 68 may be easily unfastened from the struts 70 and the apparatus thereafter removed from the side of the bus and the door 71 can then be closed tight and the batteries and vehicle are ready for operation.

Thus from the present invention it is obvious that a novel battery remover apparatus and reset apparatus has been provided for readily removing heavy batteries from commercial vehicles and other vehicles that require constant checking thereof so that they will not fail in service.

It is apparent from the present invention that a rigid and compact structure for handling heavyweight batteries, for example those weighing up to 75 lbs., may be easily removed to a table that can be pulled alongside of a vehicle and thereby eliminate the heavy back breaking work required heretofore.

In addition the present invention provides a novel apparatus that can be rolled alongside the tray normally disposed within a vehicle that carries heavy batteries, and tension means attached to the tray so that it may be pulled out of its battery compartment and the leading into the battery thereafter merely tipped or lifted on a roller and pulled onto the table of the battery remover apparatus thereby eliminating injuries which occurred heretofore, such as injury to the back of persons attempting to lift these heavy batteries from their enclosed compartment, as well as injuries due to the heavy batteries falling on a limb of the person referring it.

The battery remover apparatus of the present invention is also provided with a novel split roller thereon disposed adjacent the leading edge of the battery support table upon which the batteries are finally disposed before being removed from the apparatus to a workbench or the like so that the battery is easily slid onto the table without requiring the operator to take the entire weight of these batteries, as done before.

The present invention further provides a novel apparatus in which an inexpensive reset or replacement device can be detachably connected to the battery remover for forcing or pushing the battery tray and its heavy batteries back into the battery compartment without requiring any exertion on the part of the operator performing this task.

In addition the party may use the apparatus to selectively operate the apparatus either as a battery remover or as a battery replacement device.

Inasmuch as various changes may be made in the form, location and relative arrangement of the several parts without departing from the essential characteristics of the invention, it will be understood that the invention is not to be limited except by the scope of the appended claims.

I claim:

1. A battery remover apparatus comprising frame means including spaced pairs of vertical members, two longitudinally extending horizontal members secured to the upper portions of said vertical members, and a transversely extending horizontal member secured to said longitudinal horizontal members, said longitudinal horizontal members extending a substantial distance beyond one pair of said vertical members to provide a battery receiving space therebetween, depending vertical members secured to said longitudinal horizontal members adjacent the end thereof extending beyond said pair of vertical members for abutting a vehicle, a battery support table extending transversely of said longitudinal horizontal members and disposed on said frame means opposite said depending vertical members for receiving a battery thereon, split roller means extending transversely of said horizontal members disposed between said space and said battery table and contiguous to the side edge of said battery table, flexible cable means connected to said frame means for attachment to a battery tray disposed within a vehicle for pulling it therefrom, and cable winding means on said frame means disposed below said battery table for tensioning and winding said cable means upon said frame means to pull the battery from a vehicle to a point adjacent said split roller means.

2. The battery remover apparatus of claim 1 wherein said cable winding means are provided with a ratchet wheel and pawl means for preventing slack in said cable means after said cable means are tensioned.

3. In combination, a slidable battery tray for supporting batteries therein in an enclosed compartment of a vehicle, a battery remover frame means including pairs of spaced vertical members and longitudinally extending members secured to the upper portion of said pairs of vertical members, said longitudinally extending horizontal members being spaced apart to provide a battery receiving opening therein, one end of said horizontal members extending beyond a pair of said vertical members, a battery receiving table secured to said horizontal members adjacent the opposite end thereof, split roller means secured to said horizontal members and extending transversely thereof between said space and said battery table, cable means secured to said horizontal members adjacent and below said battery table for attachment to said slidable tray to pull the battery out of the compartment of a vehicle, and cable winding means for winding said cable means up into a coil to slide the tray into said space in a direction toward said split roller means so said battery can be pulled onto said table.

4. The apparatus of claim 3 wherein said cable means comprises a main cable having a ring connected to one end thereof and another cable threaded through said ring and having hooks connected to the opposite ends thereof.

5. The combination of claim 3 wherein said battery tray comprises a horizontal bottom with upstanding vertical walls disposed around the perimeter thereof and handle means secured to one of said walls.

6. The combination of claim 5 wherein said slidable tray is provided with guide rods extending out from one side thereof.

7. In combination a battery support frame for the battery compartment of a vehicle including a platform with roller means extending thereabove, a battery tray carried by said platform including a bottom and upstanding walls disposed about the perimeter of said bottom, and battery remover frame means including a plurality of vertical members, longitudinally extending horizontal members secured to the upper portion of said vertical members, said horizontal members being spaced from one another to provide a space therebetween for receiving said tray therein, a battery table secured to said horizontal members adjacent one end thereof and disposed adjacent said space, split roller means secured to said horizontal members between said space and said battery table and in substantial alignment with the frame of said table, cable means connected to said remover frame means for attachment to said battery tray for pulling it into said space, and cable winding means on said battery remover frame means for tensioning and winding said cable means into a coil to pull the battery tray into said space until it is adjacent said split roller means so said batteries can be lifted onto said table.

8. The apparatus of claim 7 wherein said cable means includes a main cable having a hook connected to one end thereof and another cable threaded through said ring and having hooks connected to the opposite end thereof.

9. The apparatus of claim 7 wherein said cable winding means includes a transversely extending rotatable member extended between said horizontal members with a ratchet member on one end thereof and a handle on the other end thereof, and a pawl member for preventing slack in said cable means once it is tensioned.

10. The apparatus of claim 7 wherein depending vertical members are disposed on said horizontal members for positioning adjacent a vehicle.

11. A battery remover and replacement apparatus comprising a plurality of vertical members and longitudinally extending horizontal members secured to the upper portion of said vertical members, said horizontal members being spaced from one another to provide a space for receiving a battery therebetween, a battery table secured transversely of said horizontal members for receiving a battery thereon, split roller means disposed adjacent said table and within said space for supporting a battery for movement onto said table, cable means connected to said horizontal members for attachment to a battery tray disposed within a vehicle to pull it into said space, cable winding means on said horizontal members for tensioning and winding said cable means into a coil to pull the battery adjacent said split roller means, and detachable reset means for connection to said horizontal members to extend therebetween for pushing said batteries back into a vehicle, said reset means being removed from said horizontal members when a battery is being pulled onto said table.

12. Apparatus as defined in claim 11 wherein said reset means which comprises an upper bar for securing to said horizontal members and a lower bar for securing to said vertical members and a connecting bar secured to said upper and lower members.

13. The apparatus of claim 12, wherein said lower bar is provided with out-turned legs on the opposite ends thereof extending in the same direction from said lower bar.

14. A battery replacement apparatus comprising vertical members and horizontal members secured to the upper portion of said vertical members, said horizontal members being spaced apart from one another to provide a space therebetween, a replacement member extending between said horizontal members for pushing a battery back into a vehicle, cable means for attachment to a battery tray and cable winding means carried by said horizontal members and adapted to be operated so as to tension and wind said cable means into a coil to pull a battery out of said battery receiving space, said cable means including a main cable with a ring, said cable means including a main cable with a ring thereon and another cable threaded through said ring and having hooks connected to the opposite ends thereof, and other hooks for connection to a vehicle and secured to said first-mentioned hooks, and including depending vertical members secured to said horizontal members and projecting thereabove for receiving said replacement member thereon.

References Cited in the file of this patent

UNITED STATES PATENTS

| | | |
|---|---|---|
| 1,479,612 | Joyner | Jan. 1, 1924 |
| 1,563,863 | Joyner | Dec. 1, 1925 |
| 1,566,089 | Harding | Dec. 15, 1925 |
| 1,664,517 | Liebl | Apr. 3, 1928 |
| 1,741,292 | Gillmet | Dec. 31, 1929 |
| 1,933,211 | Flowers | Oct. 31, 1933 |
| 2,534,156 | Wyatt et al. | Dec. 12, 1950 |
| 2,773,615 | Conway | Dec. 11, 1956 |
| 3,056,517 | Trumbull | Oct. 2, 1962 |